United States Patent Office 3,203,821
Patented Aug. 31, 1965

3,203,821
FLOCKS FOR THE PRODUCTION OF VELVET-LIKE OR PLUSH-LIKE MATERIALS AND PROCESS FOR THE PRODUCTION OF SUCH MATERIALS BY ELECTROSTATIC MEANS
Bernhard Josef Domin, Bonn (Rhine), Germany, assignor to Dr. Plate G.m.b.H., Bonn (Rhine), Germany
No Drawing. Filed May 18, 1962, Ser. No. 195,988
Claims priority, application Germany, May 25, 1961, P 27,217
9 Claims. (Cl. 117—17)

This invention relates to flocks for the production of velvet-like or plush-like materials and to a process for the production of such materials by electrostatic means.

Flocks consisting of natural fibres or semi-synthetic or fully synthetic fibres are used on a large scale for the fibre-coating of articles for the production of velvet-like or plush-like materials by electrostatic means. These flocks are fibres which have a length differing according to the purpose of use. In the process for the production of velvet-like or plush-like materials these fibre-flocks are caused to adhere to a fabric. The flocks are generally cut from tows and thereafter opened and dried. In order to increase the springiness of the flocks in the electrostatic field, it has been proposed to add inorganic potassium salts to a solution with which the flocks are treated in order to open them, said solution having a temperature of at least 65° C.

It has now been found that the flocks show a particularly advantageous behavior in the production of velvet-like or plush-like materials by electrostatic means if they are treated with a preparation, which has the following composition:

(1) An anti-electrostatic agent,
(2) A substance with very high dielectric constant, advantageously a substance which falls with the definition of a ferro-electric-substance or Rochelle salt electric-substance,
(3) An agent for improving the trickling capacity of the flocks, advantageously boric acid or sodium sulphate.

The expression "ferro-electric-substance or Rochelle salt electric-substance" is taken from the book: Herbert Sachse, Ferroelektrika, Springer Verlag, 1956, 1st preface. Ferro-electric or Rochelle salt electric substances are compounds which exhibit spontaneous electric polarization, electric hysteresis, and piezoelectricity. Agents for improving the trickling capacity of the flocks are compounds which are capable of retaining excess moisture and of producing a distinct low roughness of the surface of the flocks thus avoiding the formation of agglomerations of flocks due to the adhesion known to exist between very smooth surfaces. Such compounds are, for instance, boric acid or sodium sulphate.

The flocks according to the invention are very highly charged in the electrostatic field and are aligned perpendicularly of the axis of the electric field of force. By this means, the individual fibres of the flocks take up considerable energy, so that they are projected at high velocity into the adhesive support. The substance contained in the flock preparation which has a very high di-electric constant is preferably a ferro-electric-substance or Rochelle salt electric-substance with a Curie point which is approximately at room temperature, since generally the fibre-coating is carried out at room temperature. At the Curie point, ferro-electrics and Rochelle salt electrics have a very high dielectric constant. It is preferred to use sodium-potassium tartrate, which has a ε-value much higher than 1000 at its Curie point, which is 24° C. By addition of for example barium, strontium, calcium stannate or zirconate, it is also possible in a manner known per se to influence the Currie temperature and thus also to change the Curie point of other ferro-electrics of Rochelle salt electrics as may be required.

Anti-electrostatic agents, which can be used in accordance with the invention, have already been described. For example, it is possible to use the sodium salt of condensation products of fatty acids and sarcosine, for example, the sodium salt of N-octadecanoyl sarcosine phosphoric acid esters or anion-active polyvinyl alchol derivates or preferably mixtures of these substances. Other antistatic agents are for example known from U.S. patent specifications Nos. 2,843,575; 2,897,201 and 2,848,451 or French patent specification 1,154,017.

The agents for improving the trickling capacity of the flocks appear to act not only as such, but also to assist appreciably the springiness of the flock.

The weight of the preparation on the flock is somewhat above 01% and advantageously at 05-2% of the weight of the flock.

In the process for the production of velvet-like or plush-like materials by fibre-coating by electrostatic means, there are used in accordance with the invention fibre flocks which are dressed with a preparation containing an antistatic agent, a substance with a very high dielectric constant, advantageously a ferro-electric-substance or Rochelle salt electric-substance and an agent for improving the trickling capacity, for example boric acid or sodium sulphate.

It is particularly desirable to use in this process flocks which are obtained by one of the following methods:

(a) A tow or a roving of natural, fully synthetic or semi-synthetic filaments or fibres, after removal of the spinning preparation, is impregnated with the solution of a mixture consisting of an antistatic agent and a substance with a very high dielectric constant and an agent for improving the trickling capacity, for example boric acid or sodium sulphate, and then is cut, wet, or dry, in a manner known per se to form flocks and the dry flocks are opened.

(b) A tow or a roving of natural, fully synthetic or semi-synthetic filaments or fibres is cut in a manner known per se to produce flocks, the flocks are provided with the solution of the antistatic agent, the substance with the very high dielectric constant and an agent for improving the trickling capacity, for example boric acid or sodium sulphate, are separated from the excess impregnating solution, dried and opened.

(c) Flocks of the required length opened in a manner known per se are sprayed with the impregnating solution of the antistatic agent, the substance with a very high dielectric constant and the agent for improving the trickling capacity, for example boric acid or sodium sulphate, and dried.

It is preferred to use flocks which are produced by the methods (a) or (b).

When carrying out the method (a), a tow freed from spinning preparation and degreased is conducted through a trough with the solution of the impregnating preparation, preferably under tension, so that simultaneously a setting of the individual filaments is produced. The solution of the impregnating preparation can also be sprayed on to the tow. An excess of the solution can for example be removed by expressing, blowing off or suction-filtering. Such a quantity of the solution must remain on the tow that, after evaporation of the solvent, an excess in the form of a film of the indicated thickness is obtained. Thereafter the tow is cut by usual methods to form the flock and this is further processed.

When working in accordance with the method (b), one may proceed by first washing the residues of the wetting or washing agent and also of the spinning preparation out of the flock in an impregnating centrifuge and then treating the flock immediately therafter with the impregnating solution without removing it from the centrifuge. The bath volume used can in this case be small. For example, a bath volume of 1:5 is sufficient, so that it is possible to work economically without additional preparative apparatus. Treatment with the impregnating solution lasts for about 5–20 minutes, advantageously for about 10 minutes. After this time, the impregnating solution is removed by centrifuging and the flock is dried and opened in a manner known per se.

The preparation on the flocks according to the invention has an extraordinarily good moisture-retaining power and, when carrying out the fibre-coating of articles by electrostatic means, the flocks have a very good springiness, which is superior to that of the prior known flocks. The new flocks are substantially insensitive to differences in moisture. Since fat-containing spinning preparations are washed out of the flock and are not replaced by any further fatty substances, the flocks adhere very satisfactorily to the fibre-coated articles. Because of the high degree of springiness and the good sliding of the fibres past one another, a very high fibre density can be produced. The fibre-coating of articles by electrostatic means with the fibre flocks according to the invention can be carried out in a manner known per se with the conventional apparatus.

The length and the thickness of the fibres depend on the intended purpose of use. Usually fibres with a length of about 0.5 mm. to a few millimetres are used.

In order that the invention may be further understood the following examples are given by way of illustration only.

*Example 1*

1000 g. of washed nylon–6 fibres, 20 den., 3 mm., with a moisture content of 13% were mixed with 5000 g. of a solution containing 2.1% of the sodium salt of N-octadecanoyl sarcosine, 1.6% of boric acid and 4.8% of sodium-potassium tartrate, said solution being at a temperature of 55° C. After 10 minutes, centrifuging was carried out to the original weight of 1000 g. and the fibre flock was dried and opened. Since the 13% moisture of the fibres being used consists of free water and the solution containing the preparation is surface active a sufficient quantity of the preparatory solution remains on the fibres when they are centrifuged to their original weight.

*Example 2*

1000 g. of washed and dried polyacrylonitrile flock fibres, 15 den., 3 mm., were mixed for a period of 10 minutes with a solution having a temperature of 55° C. and being composed of 2.9% of the sodium salt of N-octadecanoyl sarcosine, 0.94% of boric acid, 2.85% of barium titanate and 0.46% of barium stannate. Centrifuging was then carried out to 1100 g. and the fibre flock was dried and opened.

*Example 3*

1000 g. of washed nylon–6 fibres, 20 den., 3 mm., with a moisture content of 13%, were mixed with 5000 g. of a solution having a temperature of 55° C. and containing 3% of the sodium salt of N-octadecanoyl, 0.5% of boric acid and 2% of potassium-sodium tartrate. After 10 minutes, centrifuging was carried out to the original weight of 1000 g. and the flock was dried and opened. Since the 13% moisture of the fibres used consists of free water, and the preparatory solution is surface-active, a sufficient quantity of said solution still remains on the fibre when centrifugation to the original weight is carried out.

*Example 4*

1000 g. of washed and dried polyacrylonitrile flock fibres, 15 den., 3 mm., were mixed for a period of 10 minutes with a solution having a temperature of 55° C. and containing 6% of the sodium salt of N-octadecanoyl sarcosine, 0.94% of boric acid, 2.85% of barium titanate and 0.46% of barium stannate. Centrifuging was then carried out to a weight of 1100 g. and the flock was dried and opened.

*Example 5*

100 g. of washed polyacrylonitrile fibres, 15 den., 3 mm., with a moisture content of 9.5% were mixed for a period of 10 minutes with a solution having a temperature of 55° C. and containing 2% of phosphoric acid triethyl ester, 2% of sodium sulphate and 4% of potassium-sodium tartrate. Centrifuging to a weight of 1035 g. was then carried out and the flock was dried and opened.

*Example 6*

1000 g. of washed and dried cuprammonium rayon flock fibres, 3.75 den., 1 mm., were mixed with 5000 g. of a solution having a temperature of 50° C. and containing the following constituents: 1.5% of the sodium salt of N-octadecanoyl sarcosine, 0.09% of boric acid and 0.20% of potassium-sodium tartrate. After 10 minutes, centrifuging was carried out to a weight of 1800 g. The flocks then only needed to be dried. It was not necessary to open the flock, since it was already satisfactorily separated.

*Example 7*

1000 g. of washed nylon–6 fibres, 20 den., 3 mm., with a moisture content of 13%, were mixed with a solution having a temperature of 55° C. and containing 3% of the sodium salt of N-octadecanoyl sarcosine, 1.5% of potassium-sodium tartrate and 1.5% of sodium sulphate. After 10 minutes, centrifuging was carried out to a weight of 960 g. and the flock was dried and opened.

In all cases, good springy fibres with little curvature were obtained which showed good bonding in adhesive.

What I claim is:

1. Fibre flocks for the production of velvet-like and plush-like materials by electrostatic means, said fibre flocks being coated with 0.1–2% of their weight of a preparation which comprises an organic anti-electrostatic agent, a ferro-electric-substance, and a member selected from the group consisting of boric acid and sodium sulphate.

2. Fibre flocks for the production of velvet-like and plush-like materials by eletrostatic means, said fibre flocks being coated with 0.1–2% of their weight of a preparation which comprises an organic anti-electrostatic agent, sodium-potassium tartrate, and a member selected from the group consisting of boric acid and sodium sulphate.

3. Fibre flocks for the production of velvet-like and plush-like materials by electrostatic means, said fibre flocks being coated with 0.1–2% of their weight of a preparation which comprises an organic anti-electrostatic agent, barium titanate, and a member selected from the group consisting of boric acid and sodium sulphate.

4. Fibre flocks for the production of velvet-like and plush-like materials by electrostatic means, said fibre flocks being coated with 0.1–2% of their weight of a preparation which comprises the sodium salt of N-octadecanoyl sarcosine, sodium-potassium tartrate, and boric acid.

5. Fibre flocks for the preparation of velvet-like and plush-like materials by electrostatic means, said fibre flocks being coated with 0.1–2% of their weight of a preparation which comprises the sodium salt of N-octadecanoyl sarcosine, sodium-potassium tartrate, and sodium sulphate.

6. Fibre flocks for the preparation of velvet-like and plush-like materials by electrostatic means, said fibre flocks being coated with 0.1–2% of their weight of a preparation which comprises the sodium salt of N-octadecanoyl sarcosine, barium titanate, barium stannate and boric acid.

7. In a process for the production of velvet-like and plush-like materials by electrostatically depositing fibre flocks on a fabric coated with an adhesive, the step which comprises electrostatically depositing on the adhesive coated fabric fibre flocks being coated with 0.1 to 2% of their weight of a preparation which comprises an organic anti-electrostatic agent, a ferro-electric substance, and a member selected from the group consisting of boric acid and sodium sulphate.

8. In a process for the production of velvet-like and plush-like materials by electrostatically depositing fibre flocks on a fabric coated with an adhesive, the step which comprises electrostatically depositing on the adhesive coated fabric fibre flocks being coated with 0.1 to 2% of their weight of a preparation which comprises an organic anti-electrostatic agent, sodium-potassium tartrate, and member selected from the group consisting of boric acid and sodium sulphate.

9. In a process for the production of velvet-like and plush-like materials by electrostatically depositing fibre flocks on a fabric coated with an adhesive, the step which comprises electrostatically depositing on the adhesive coated fabric fibre flocks being coated with 0.1 to 2% of their weight of a preparation which comprises an organic anti-electrostatic agent, barium titanate, and a member selected from the group consisting of boric acid and sodium sulphate.

References Cited by the Examiner

UNITED STATES PATENTS

| 671,760 | 4/01 | Florin et al. | 117—139.5 |
|---|---|---|---|
| 2,037,835 | 4/36 | Taylor | 117—4 |
| 2,038,723 | 4/36 | Drefus | 117—139.5 |
| 2,067,175 | 1/37 | Dickie | 117—4 |
| 2,153,358 | 4/39 | Whitehead | 117—4 |
| 2,992,126 | 7/61 | Roberts et al. | 117—27 |

RICHARD D. NEVIUS, *Primary Examiner.*